United States Patent [19]

Isozaki

[11] Patent Number: 5,043,366

[45] Date of Patent: Aug. 27, 1991

[54] SELF-CURING AQUEOUS RESIN DISPERSION BASED ON ALICYCLIC EPOXIES

[75] Inventor: Osamu Isozaki, Hiratsuka, Japan

[73] Assignee: Kansai Paint Co., Ltd., Hyogo, Japan

[21] Appl. No.: 481,056

[22] Filed: Feb. 16, 1990

[30] Foreign Application Priority Data

Feb. 20, 1989 [JP] Japan .................................... 1-39533
Mar. 3, 1989 [JP] Japan .................................... 1-51069

[51] Int. Cl.[5] .......................................... C08L 63/02
[52] U.S. Cl. .................................... 523/410; 523/402; 523/403; 523/404; 523/407; 523/408; 523/409; 523/411; 523/412; 523/414; 525/108; 525/112; 525/117; 525/119; 525/286; 525/301; 525/312; 526/268; 526/273
[58] Field of Search ........................ 523/407, 408, 410

[56] References Cited

U.S. PATENT DOCUMENTS

| | | | |
|---|---|---|---|
| 4,212,781 | 7/1980 | Evans et al. ........................ | 523/407 |
| 4,304,701 | 12/1981 | Das et al. ............................ | 523/407 |
| 4,444,923 | 4/1984 | McCarty ............................. | 523/408 |
| 4,446,258 | 5/1984 | Chu et al. ............................ | 523/408 |
| 4,581,395 | 4/1986 | Nakaya et al. ...................... | 523/410 |

Primary Examiner—John Kight, III
Assistant Examiner—Frederick Krass
Attorney, Agent, or Firm—Wenderoth, Lind & Ponack

[57] ABSTRACT

A self-curing aqueous resin dispersion obtained by neutralizing a resin having at least one alicyclic epoxy group and at least two carboxyl groups in the molecule, with a base and dispersing the neutralized resin in water.

17 Claims, No Drawings

SELF-CURING AQUEOUS RESIN DISPERSION BASED ON ALICYCLIC EPOXIES

The present invention relates to a self-curing aqueous resin dispersion and more particularly to an aqueous resin dispersion obtained by neutralizing a resin having at least one alicyclic epoxy group and at least two carboxyl groups in the molecule and then dispersing the neutralized resin in water.

It is known that mixtures of a carboxyl group-containing polymer and a polyfunctional epoxy compound as well as mixtures of an epoxy group-containing polymer and a polyfunctional carboxyl compound are heat-curable and used in powder paints. Meanwhile, aqueous compositions obtained by allowing a carboxyl group-containing polymer or compound and an epoxy group-containing polymer or compound to coexist in water, have problems in curability and stability and accordingly have not yet been put into practical use. For example, a mixture of an aqueous composition obtained by dispersing an epoxy group-containing resin in water in the presence of a surfactant and an aqueous dispersion obtained by neutralizing a carboxyl group-containing resin with a base and dispersing the neutralized resin in water has insufficient curability because the two dispersions have no sufficient compatibility with each other at the time of curing. Also, an aqueous composition obtained by mixing a water-soluble epoxy resin with an aqueous solution of a carboxyl group-containing resin neutralized with a base, has poor storage stability and causes gelation in a few to several days.

The present inventors made extensive study in order to obtain an aqueous resin composition which is free from the above-mentioned problems and which can be cured by a reaction between epoxy group and carboxyl group. As a result, it was found that when a resin having at least one alicyclic epoxy group and at least two carboxyl groups in the molecule was neutralized with a base and the neutralized resin was dispersed in water, the resulting aqueous resin dispersion unexpectedly showed excellent storage stability and moreover excellent curability after coating. The finding has led to the completion of the present invention.

According to the present invention, there is provided a self-curing aqueous resin dispersion obtained by neutralizing a resin having at least one alicyclic epoxy group and at least two carboxyl groups in the molecule, with a base and dispersing the neutralized resin in water.

The aqueous resin dispersion of the present invention is hereinafter described in detail.

The "alicyclic epoxy group" contained in the resin according to the present invention is a group having an alicyclic ring and an epoxy group, wherein the epoxy group is formed by an oxygen atom and the two adjacent carbon atoms constituting the alicyclic ring. Specific examples of the alicyclic epoxy group include the groups represented by the following formulas.

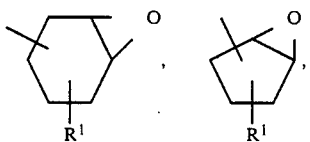

-continued

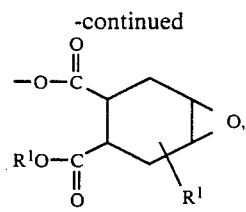

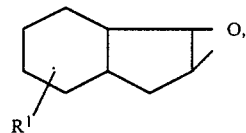

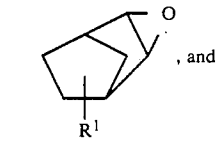

, and

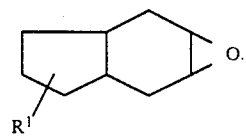

In the above formulas, $R^1$ is a hydrogen atom or a monovalent hydrocarbon group of 1-8 carbon atoms. Specific examples of $R^1$ include a hydrogen atom and alkyl groups such as methyl, ethyl, n-propyl, n-butyl, isobutyl, tert-butyl, 2-ethylhexyl and the like. A hydrogen atom is particularly preferable.

In the present invention, the "resin having at least one alicyclic epoxy group and at least two carboxyl groups in the molecule" includes those resins having an acid value of ordinarily 20-200, preferably 30-120, more preferably 56-112, from the standpoint of, for example, dispersibility in water and an epoxy equivalent of ordinarily 200-5,000, preferably 500-2,000, more preferably 500-1,000 from the standpoint of, for example, curability of film formed therewith. It is preferable that the resin further have a number-average molecular weight of ordinarily 1,000-100,000, preferably 3,000-30,000, more preferably 5,000-20,000.

The resin having alicyclic epoxy group(s) and carboxyl groups according to the present invention has no particular restriction as long as it has film formability, and can be selected from a wide range of resins. As preferable examples of the resin, there can be mentioned those obtained by, for example, the following methods [I], [II] and [III].

[I] A method comprising subjecting (a) a compound or resin having at least two alicyclic epoxy groups in the molecule and (b) a compound or resin having at least two carboxyl groups in the molecule, to a partial addition reaction.

[II] A method comprising copolymerizing:

(A) a carboxyl group-containing polymerizable unsaturated resin obtained by adding an epoxy group-containing polymerizable unsaturated monomer to a (co)polymer of a carboxyl group-containing polymerizable unsaturated monomer, to introduce a polymerizable unsaturated group into part of the carboxyl groups of said (co)polymer.

(B) an alicyclic epoxy group-containing polymerizable monomer, and optionally (C) an unsaturated monomer copolymerizable with the resin (A) and/or the monomer (B).

[III] A method comprising copolymerizing:

(D) an alicyclic epoxy group-containing polymerizable unsaturated resin obtained by adding a carboxyl group-containing polymerizable unsaturated monomer to a (co)polymer of an alicyclic epoxy group-containing polymerizable unsaturated monomer, to introduce a polymerizable unsaturated group into part of the epoxy groups of said (co)polymer, (E) a carboxyl group-containing polymerizable monomer, and optionally (F) an unsaturated monomer copolymerizable with the resin (D) and/or the monomer (E).

The "compound or resin (a) having at least two alicyclic epoxy groups in the molecule" used in the above method [I] includes, for example, compounds represented by the formula

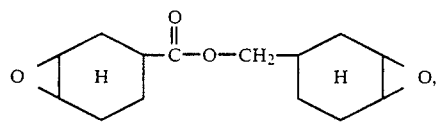

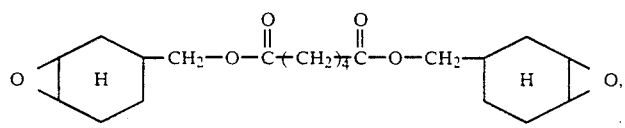

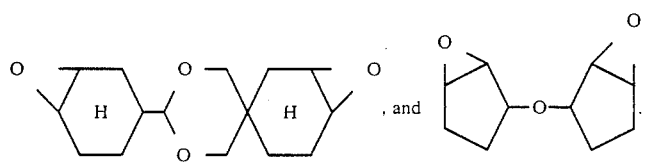

and alicyclic epoxy group-containing vinyl (co)polymers. These compounds and (co)polymers can be used alone or in admixture of two or more.

Of the above compounds and resins (a) having at least two alicyclic epoxy groups in the molecule, those having a large molecular weight are preferable in view of storage stability, etc. Vinyl (co)polymers having alicyclic epoxy groups as the side chains are particularly preferable.

The alicyclic epoxy group-containing vinyl (co)polymers include homopolymers of an alicyclic epoxy group-containing polymerizable monomer and copolymers of said monomer with other monomer copolymerizable therewith. As examples of the alicyclic epoxy group-containing polymerizable monomer, there can be mentioned those compounds represented by the following general formulas.

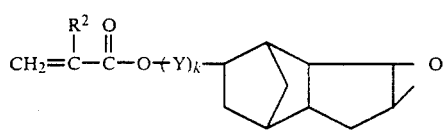 (1)

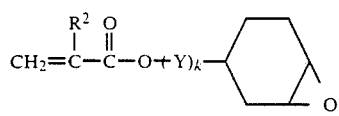 (2)

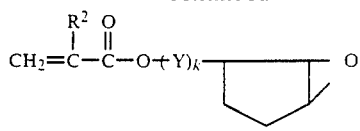 (3)

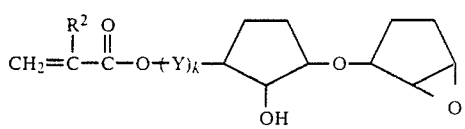 (4)

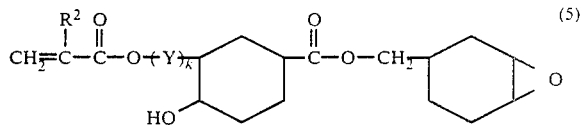 (5)

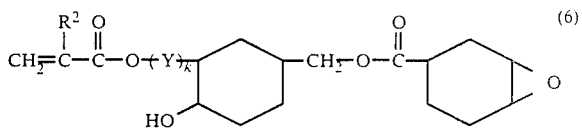 (6)

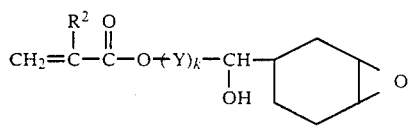 (7)

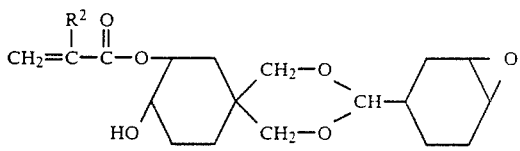 (8)

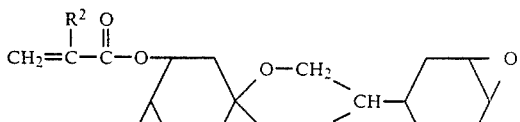 (9)

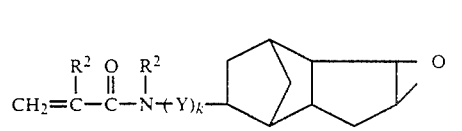 (10)

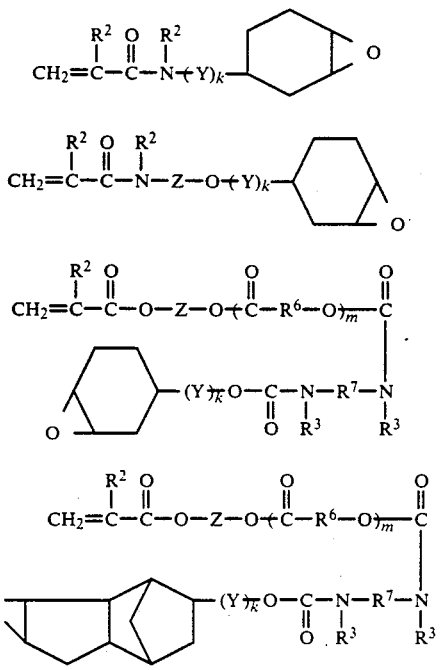

In the above general formulas, $R^2$ and $R^3$, which may be same or different from each other, are each a hydrogen atom or a methyl group; Y and Z, which may be same or different from each other, are each a bivalent group represented by the formula

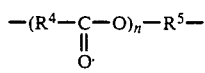

($R^4$ is a bivalent aliphatic saturated hydrocarbon group of 1-10 carbon atoms, $R^5$ is a bivalent aliphatic saturated hydrocarbon group of 1-6 carbon atoms, and n is an interger of 0-10); $R^6$ and $R^7$, which may be same or different from each other, are each a bivalent saturated hydrocarbon group of 1-10 carbon atoms; k is 0 or 1; and m is an integer of 0-10. The aliphatic saturated hydrocarbon group can be a straight chain of a branched chain. Therefore, specific examples of $R^5$ include methylene, ethylene, propylene, isopropylene, butylene, 2-methyl-propylene, 2,2-dimethylpropylene, hexylene, etc.; specific examples of $R^4$, $R^6$ and $R^7$ include, in addition to those specific examples mentioned for $R^5$, 2-ethylhexylene, etc.

Of the above alicyclic epoxy group-containing polymerizable monomers, preferable are the monomers represented by the general formula (2) because they can be easily produced industrially.

As the other monomer copolymerizable with the alicyclic epoxy group-containing polymerizable monomer, there can be mentioned, for example, $C_1$-$C_{18}$ alkyl esters of (meth)arylic acid such as methyl (meth)acrylate, ethyl (meth)acrylate, n-butyl (meth)acrylate, iso-butyl (meth)acrylate, hexyl (meth)acrylate, 2-ethylhexyl (meth)acrylate, lauryl (meth)acrylate and the like; hydroxyl group-containing unsaturated monomers such as $C_2$-$C_8$ hydroxyalkyl esters of (meth)acrylic acid such as 2-hydroxyethyl, (meth)acrylate, hydroxypropyl (meth)acrylate and the like and allyl alcohol and the like; aromatic vinyl compounds such as styrene, α-methylstyrene, vinyltoluene and the like; vinyl acetate; (meth)acrylamide; (meth)acrylonitrile; and N-methylol (meth)acrylamide butyl ether. These monomers can be used alone or in combination of two or more.

The alicyclic epoxy group-containing vinyl (co)-polymer can be produced by, for example, a method comprising polymerizing the above-mentioned monomer(s) in the presence of a polymerization catalyst, preferably in an organic solvent.

The thus obtained vinyl (co)polymer having at least two alicyclic epoxy groups in the molecule desirably has a number-average molecular weight of ordinarily 1,000-100,000, preferably 3,000-30,000.

The number of alicyclic epoxy groups to be possessed by the alicyclic epoxy group-containing vinyl (co)-polymer is, on average, at least two per molecule in order to form a sufficient network. 5-50 epoxy groups per molecule is preferable and 5-20 epoxy groups per molecule is more preferable.

Meanwhile, as the "compound or resin (b) having at least two carboxyl groups in the molecule" used in the above method [I], there can be mentioned, for example, low-molecular weight aliphatic, alicyclic or aromatic polybasic carboxylic acids such as succinic acid, adipic acid, sebacic acid, azelaic acid, decanedicarboxylic acid, phthalic acid, isophthalic acid, terephthalic acid, hexahydrophthalic acid, hexahydroisophthalic acid, hexahydroterephthalic acid, trimellitic acid and the like; carboxyl group-containing polyester resins obtained by condensing one of the above polybasic carboxylic acids with polyhydric alcohol; and carboxyl group-containing vinyl (co)polymers.

Of the above compounds or resins (b) having at least two carboxyl groups in the molecule, those having a large molecular weight are preferable in view of storage stability, etc. Vinyl (co)polymers having carboxyl groups as the side chains are particularly preferable.

The carboxyl group-containing vinyl (co)polymers include homopolymers of a carboxyl group-containing unsaturated monomer and copolymers of said monomer with other monomer copolymerizable therewith.

As the carboxyl group-containing unsaturated monomer, there can be most typically used methacrylic acid and acrylic acid. There can also be used maleic acid, fumaric acid, itaconic acid, crotonic acid, an addition product of (meth)acrylic acid and ε-caprolactone, etc.

As the other monomer copolymerizable with the carboxyl group-containing unsaturated monomer, there can be used the same monomers as mentioned for the epoxy group-containing vinyl copolymers.

The carbonyl group-containing vinyl (co)polymers can be produced by the same production method as mentioned for the epoxy group-containing vinyl (co)-polymer.

The thus obtained vinyl (co)polymer having at least two carboxyl groups in the molecule desirably has a number-average molecular weight of ordinarily 1,000-100,000, preferably 3,000-30,000.

The number of carboxyl groups to be possessed in the carboxyl group-containing vinyl (co)polymer is, on average, at least two per molecule in order to form a sufficient network. 5-50 carboxyl groups per molecule is preferable and 5-20 carboxyl groups per molecule is more preferable.

In the method [I], the compound or resin (a) having at least two alicyclic epoxy groups in the molecule and the compound or resin (b) having at least two carboxyl groups in the molecule are subjected to a partial addition reaction to obtain a reaction product having at least one epoxy group and at least two carboxyl groups in the molecule.

The partial addition reaction between the component (a) and the component (b) can be effected by reacting the two components for 30 minutes to 8 hours at 50°–150° C., preferably 50°–120° C. This reaction can be followed by measurement of said value.

It is generally advantageous that the reaction be terminated when there is seen a reduction in acid value of about 0.5–50%, preferably 1–20% based on the acid value before reaction, although the reduction in acid value as a yardstick for the termination of the reaction varies depending upon the molecular weight and number of epoxy or carboxyl groups per molecule, of each component to be reacted. Care must be taken because too much progress of the addition reaction causes gelation.

In the partial addition reaction between the component (a) and the component (b), the appropriate ratio of the compound or resin (a) having at least two epoxy groups in the molecule to the compound or resin (b) having at least two carboxyl groups in the molecule is ordinarily 5/95 to 95/5, preferably 20/80 to 80/20, more preferably 30/70 to 70/30 by weight.

Then, description is made on the method [II].

The carboxyl group-containing unsaturated resin (A) used in the method [II] can be a polymerizable unsaturated resin obtained by adding an epoxy group-containing polymerizable unsaturated monomer to part of the carboxyl groups of a (co)polymer of a carboxyl group-containing polymerizable unsaturated monomer. As examples of the (co)polymer of a carboxyl group-containing polymerizable unsaturated monomer, there can be mentioned the carboxyl group-containing vinyl (co)polymers mentioned in the method [I] for the compound or resin (b) having at least two carboxyl groups in the molecule. As examples of the epoxy group-containing polymerizable unsaturated monomer to be added to the (co)polymer of a carboxyl group-containing polymerizable unsaturated monomer to introduce a polymerizable unsaturated group into said (co)polymer, there can be mentioned epoxy group-containing esters of (meth)acrylic acid such as glycidyl methacrylate, glycidyl acrylate, 3,4-epoxycyclohexylmethyl methacrylate, 3,4-epoxycyclohexylmethyl acrylate and the like, as well as allyl glycidyl ether.

The carboxyl group-containing polymerizable unsaturated resin (A) can be obtained by reacting a mixture of the (co)polymer of a carboxyl group-containing polymerizable unsaturated monomer with the epoxy group-containing polymerizable unsaturated monomer, for about 30 minutes to 8 hours at 50°–150° C., preferably 50°–120° C., optionally in an organic solvent optionally in the presence of a polymerizatin inhibitor such as hydroquinone or the like. The reaction is preferably effected until all the epoxy groups are reacted with the carboxyl groups.

In the above reaction, it is desirable that in the resulting polymerizable unsaturated resin there remain carboxyl groups of an amount necessary for the final copolymer [the copolymer of the components (A), (B) and (C)] to be dispersible in water after neutralization. Accordingly, the epoxy group-containing polymerizable unsaturated monomer is ordinarily used in such an amount that its epoxy groups become stoichiometrically small relative to the carboxyl groups of the (co)polymer of a carboxyl group-containing polymerizable unsaturated monomer. The addition reaction between the (co)polymer of a carboxyl group-containing polymerizable unsaturated monomer and the epoxy group-containing polymerizable unsaturated monomer can be followed by measurement of acid value.

The number of polymerizable unsaturated groups to be introduced by the addition reaction can be, on average, preferably 0.2–3.0, more preferably 0.5–1.5, per molecule of the polymerizable unsaturated resin (A).

The thus obtained carboxyl group-containing polymerizable unsaturated resin (A) is then copolymerized with an alicyclic epoxy group-containing polymerizable monomer (B) and optionally an unsaturated monomer (C) copolymerizable with the resin (A) and/or the monomer (B), whereby a graft copolymer having carboxyl groups and epoxy group(s) can be obtained.

As the alicyclic epoxy group-containing polymerizable monomer (B), there can be mentioned the alicyclic epoxy group-containing polymerizable monomers represented by the general formulas (1) to (14), mentioned in the method [I] as examples of the monomer for production of the alicyclic epoxy group-containing vinyl (co)polymer. As the monomer (C), there can be mentioned the same monomers as mentioned in the method [I] as examples of the other monomer copolymerizable with the alicyclic epoxy group-containing polymerizable monomer.

The copolymerization of a mixture of the component (A), the component (B) and optionally the component (C) has no particular restriction and can be effected according to a per se known method. For example, it can be effected in the presence of a polymerization initiator preferably in an organic solvent. It is desirable that the polymerization temperature be ordinarily 100° C. or lower, preferably 80° C. or lower. When the polymerization temperature is higher than 100° C., the addition reaction between carboxyl group and epoxy group occurs very easily, which is not preferable. The polymerization initiator can be any as long as it generates a radical at the polymerization temperature. As the polymerization initiator, there can be mentioned, for example, azobisisobutyronitrile, azobisdimethylvaleronitrile, azobiscyclohexanecarbonitrile, benzoyl peroxide, tert-butyl peroxybenzoate, acetyl peroxide, tert-butyl peroxy-2-ethylhexanoate, lauroyl peroxide and bis(4-tert-butylcyclohexyl) peroxydicarbonate. Of these, preferable are azobisdimethylvaleronitrile and bis(4-tert-butylcyclohexyl) peroxydicarbonate.

The proportions of the monomer (B) and the monomer (C) to the polymerizable unsaturated resin (A) can be selected so that the resulting copolymer has an acid value and an epoxy equivalent both as mentioned previously. It is advantageous that the monomer (B) is used specifically in an amount of ordinarilu 1–500 parts by weight, preferably 2–200 parts by weight, more preferably 10–100 parts by weight, per 100 parts by weight of the polymerizable unsaturated resin (A) and the monomer (C) in an amount of ordinarily 0–500 parts by weight, preferably 2–200 parts by weight, more preferably 10–100 parts by weight, per 100 parts by weight of the polymerizable unsaturated resin (A).

Next, description is made on the method [III].

The alicyclic epoxy group-containing polymerizable unsaturated resin (D) used in the method [III] can be a polymerizable unsaturated resin obtained by adding a carboxyl group-containing polymerizable unsaturated monomer to part of the epoxy groups of a (co)polymer of an alicyclic epoxy group-containing polymerizable unsaturated monomer. As examples of the (co)polymer of an alicyclic epoxy group-containing polymerizable unsaturated monomer, there can be mentioned the alicyclic epoxy group-containing (co)polymers mentioned in the method [I] for the compound or resin (a) having at least two alicyclic epoxy resins in the molecule. As examples of the carboxyl group-containing polymerizable unsaturated monomer to be added to the (co)-polymer of an alicyclic epoxy group-containing unsaturated monomer to introduce a polymerizable unsaturated group to said (co)polymer, there can be most typically used acrylic acid and methacrylic acid. There can also be used maleic acid, fumaric acid, itaconic acid, crotonic acid, an addition product of (meth)acrylic acid and ε-caprolactone, etc.

The alicyclic epoxy group-containing polymerizable unsaturated resin (D) can be obtained by reacting a mixture of the (co)polymer of an alicyclic epoxy group-containing polymerizable unsaturated monomer with the carboxyl group-containing polymerizable unsaturated monomer, for about 30 minutes to 8 hours at 50°-150° C., preferably 50°-120° C., optionally in an organic solvent optionally in the presence of a polymerization inhibitor such as hydroquinone or the like. The reaction is preferably effected until all the carboxyl groups are reacted with the epoxy groups.

In the above reaction, it is desirable that in the resulting polymerizable unsaturated resin there remain epoxy groups of an amount necessary for the final copolymer [the copolymer of the components (D), (E) and (F)] to have an epoxy equivalent as mentioned previously. Accordingly, the carboxyl group-containing polymerizable unsaturated monomer is ordinarily used in such an amount that its carboxyl groups become stoichiometrically small relative to the epoxy groups of the (co)-polymer of an alicyclic epoxy group-containing polymerizable unsaturated monomer. The addition reaction between the (co)polymer of an alicyclic epoxy group-containing polymerizable unsaturated monomer and the carboxyl group-containing polymerizable unsaturated monomer can be followed by, for example, measurement of acid value. The reaction can be terminated when the acid value of the reaction product becomes substantially zero.

The number of polymerizable unsaturated groups to be introduced by the addition reaction can be, on average, preferably 0.2-3.0, more preferably 0.5-1.5, per molecule of the polymerizable unsaturated resin (D).

The thus obtained epoxy group-containing polymerizable unsaturated resin (D) is then copolymerized with a carboxyl group-containing polymerizable monomer (E) and optionally an unsaturated monomer (F) copolymerizable with the resin (D) and/or the monomer (E), whereby a graft copolymer having carboxyl groups and epoxy group(s) can be obtained.

As the carboxyl group-containing polymerizable monomer (E), there can be mentioned, for example, acrylic itaconic acid, crotonic acid and an addition product of (meth)acrylic acid and -caprolactone. As the optionally used monomer (F) copolymerizable with the resin (D) and/or the monomer (E), there can be used the same monomers as mentioned in the method [II] as examples of the monomer (C).

The copolymerization of a mixture of the component (D), the component (E) and optionally the component (F) has no particular restriction and can be effected according to a per se known method. For example, it can be effected in the presence of a polymerization initiator preferably in an organic solvent. The copolymerization conditions employed in this case can be the same as mentioned for the copolymerization of a mixture of the component (A), the component (B) and optionally the component (C) in the method [II].

The proportions of the monomer (E) and the monomer (F) to the polymerizable unsaturated resin (D) can be selected so that the resulting copolymer has an acid value and an epoxy equivalent both as mentioned previously. It is advantageous that the monomer (E) is used specifically in an amount of ordinarily 1-500 parts by weight, preferably 2-200 parts by weight, more preferably 10-100 parts by weight, per 100 parts by weight of the polymerizable unsaturated resin (D) and the monomer (F) in an amount of ordinarily 0-500 parts by weight, preferably 2-200 parts by weight, more preferably 10-100 parts by weight, per 100 parts by weight of the polymerizable unsaturated resin (D).

The thus prepared resin of the present invention having at least one alicyclic epoxy resin and at least two carboxyl groups in the molecule, is neutralized with a base and then dispersed in water, whereby an aqueous resin dispersion of the present invention can be obtained.

As the base used for the neutralization of the resin, there can be advantageously used organic bases, for example, ammonia and tertiary amines such as triethylamine, tributylamine, dimethylaminoethanol, methyldiethanolamine, pyridine and the like. The neutralization equivalent can be appropriately selected depending upon, for example, the type of the resin, but is ordinarily 0.1-1.2, particularly 0.5-1.0.

The resin is stirred with an aqueous medium simultaneously with or after the neutralization with a base, to be stably dispersed in the aqueous medium, whereby an intended aqueous resin dispesion can be obtained.

The aqueous resin dispersion can comprise, as necessary, additives conventionally used in paints, such as organic solvent, pigment, anti-foaming agent, levelling agent and the like.

The aqueous resin dispersion of the present invention has excellent storage stability and excellent curability. The dispersion, when coated and heated for about 10 to 30 minutes at about 100°-180° C., can cause crosslinking and curing to form a flat and smooth film highly resistant to alkalis. When in the preparation of the aqueous resin dispersion an amine is used for neutralizaton of the resin, the amine acts as a catalyst for the reaction of epoxy groups and carboxyl groups, in the above heat curing of the dispersion.

The reason for the good storage stability and excellent curability of the aqueous resin dispersion of the present invention is not made clear yet. However, it is presumed as follows. That is, the aqueous resin dispersion has good storage stability because in the resin dispersed in water, most of the carboxyl groups are present at the surfaces of the resin particles and most of the epoxy groups are present inside the resin particles and then the carboxyl groups and the epoxy groups are separated and apart; the aqueous resin dispersion has excellent curability when heated because the resin particles are melted by heating and thereby the contact between epoxy groups and carboxyl groups in the resin is increased resulting in excellent reactivity and curability. When an amine is used as the neutralizing agent, the amine acts as a curing catalyst; this is another reason for excellent curability.

The aqueous resin dispersion of the present invention can be used in paints, adhesives, inks, etc.

The present invention is described in more detail below by way of Examples and Comparative Examples.

In the followings, parts and % refer to parts by weight and % by weight, respectively.

EXAMPLE 1

166.7 parts of a carboxyl group-containing vinyl copolymer solution having a solid content of 60% and a number-average molecular weight of about 15,000, obtained by copolymerizing 7.2 parts of acrylic acid and 92.8 parts of n-butyl methacrylate in the presence of 66.7 parts of ethylene glycol monobutyl ether and a polymerization initiator, was mixed with 50 parts of Epikote No. 1001 manufactured by Shell Chemical [a bisphenol A type epoxy resin (molecular weight: about 900) having about two glycidyl ether groups in the molecule]. They were reacted at 100° C. until the acid value of the resulting resin became 42. To the resulting partial addition reaction product solution was added 4 parts of dimethylaminoethanol. To the mixture was added 279.3 parts of deionized water. The resulting mixture was uniformly stirred to obtain an aqueous resin dispersion having a nonvolatile content of 30% and a Gardner viscosity (25°C.) of D.

EXAMPLE 2

166.7 parts of an epoxy group-containing vinyl copolymer solution having a solid content of 60% and a number-average molecular weight of about 15,000, obtained by copolymerizing 28.4 parts of glycidyl methacrylate and 71.6 parts of n-butyl methacrylate in the presence of 66.7 parts of ethylene glycol monoethyl ether and a polymerization initiator, was mixed with 166.7 parts of the carboxyl group-containing vinyl copolymer solution used in Example 1. They were reacted at 100° C. until the acid value of the resulting resin became 46. To the resulting partial addition reaction product solution was added 10 parts of dimethylaminoethanol. To the mixture was added 323.3 parts of deionized water. The resulting mixture was uniformly stirred to obtain an aqueous resin dispersion having a nonvolatile content of 30% and a Gardner viscosity (25°C.) of J.

EXAMPLE 3

200 parts of an alicyclic epoxy group-containing vinyl copolymer solution having a solid content of 50% and a number-average molecular weight of about 20,000, obtained by copolymerizing 19.6 parts of 3,4-epoxycyclohexylmethyl methacrylate and 80.4 parts of methyl methacrylate in the presence of 100 parts of isobutanol and a polymerization initiator, was mixed with 150 parts of a polyester resin having a number average molecular weight of about 5,000 and an acid value of 112, obtained by condensing diethylene glycol and trimellitic acid at a molar ratio of 1:1. They were reacted at 130° C. until the acid value of the resulting resin became 56. To the resulting partial addition reaction product solution was added 10 parts of dimethylaminoethanol. To the mixture was added 265 parts of deionized water. The resulting mixture was uniformly stirred to obtain an aqueous resin dispersion having anonvolatile content of 40% and a Gardner viscosity (25°C.) of Z.

EXAMPLE 4

200 parts of the carboxyl group-containing vinyl copolymer solution used in Example 1 was mixed with 80 parts of the alicyclic epoxy group-containing vinyl copolymer solution used in Example 3. They were reacted at 100° C. until the acid value of the resulting resin became 44. To the resulting partial addition reaction product solution was added 8 parts of dimethylaminoethanol. To the mixture was added 215 parts of deionized water. The resulting mixture was uniformly stirred to obtain an aqueous resin dispersion having a nonvolatile content of 40% and a Gardner viscosity (25° C.) of Z.

EXAMPLE 5

166.7 parts of the carboxyl group-containing vinyl copolymer solution having a solid content of 60%, used in Example 1 was mixed with 3.6 parts of glycidyl methacrylate. They were reacted at 120° C. until the acid value of the resulting resin became 42. 170.3 parts of the resulting reaction product solution was mixed with 22.4 parts of 3,4-epoxycyclohexylmethyl methacrylate, 77.6 parts of n-butyl methacrylate and 0.5 part of azobisdimethylvaleronitrile. The mixture was copolymerized at 80° C. to obtain a graft polymer solution. The graft polymer had an acid value of 20.4, an epoxy equivalent of 2,000 and a number-average molecular weight of 28,000.

To 266.8 parts of the graft polymer solution was added 15 parts of triethylamine. To the mixture was added deionized water with stirring, to disperse the neutralized polymer in water to obtain an aqueous resin dispersion having a nonvolatile content of 40% and a Gardner viscosity (25° C.) of H.

EXAMPLE 6

0.72 part of acrylic acid was added to 142.9 parts of an epoxy group-containing vinyl copolymer solution having a solid content of 70% and a number-average molecular weight of about 20,000, obtained by copolymerizing 14.2 parts of glycidyl methacrylate and 85.8 parts of methyl methacrylate in the presence of 42.9 parts of isopropanol and a polymerization initiator. They were reacted at 120° C. until an acid number of 0 was obtained. 143.62 parts of the resulting reaction product solution was mixed with 14.4 parts of acrylic acid, 85.6 parts of methyl methacrylate and 1 part of bis(4-tert-butylcyclohexyl)peroxydicarbonate. The mixture was copolymeized at 70° C. to obtian a graft polymer solution. The graft polymer had an acid value of 81, an epoxy equivalent of 2,200 and a number-average molecular weight of 48,000.

245.05 parts of the graft polymer solution was mixed with 10 parts of triethylamine. To the mixture was added deionized water with stirring, to disperse the mixture in water to obtain an aqueous resin dispersion having a nonvolatile content of 40% and a Gardner viscosity (25° C.) of R.

EXAMPLE 7

1.4 parts of glycidyl methacrylate was added to 142.9 parts of a carboxyl group-containing vinyl copolymer solution having a solid content of 70% and a number average molecular weight of about 5,000, obtained by copolymerizing 14.4 parts of acrylic acid, 74.0 parts of n-butyl methacrylate and 11.6 parts of 2-hydroxyethyl acrylate. They were reacted at 120° C. until an acid value of 106 was obtained. 144.3 parts of the resulting reaction product was mixed with 200 parts of 3,4-epoxycyclohexylmethyl methacrylate and 10 parts of azobisdimethylvaleronitrile. The mixture was polymerized at 80° C. to obtain a graft polymer solution. The graft polymer had an acid value of 35, an epoxy equivalent of 306 and a number-average molecular weight of 36,000.

344.35 parts of the graft polymer solution was mixed with 30 parts of methyldiethanolamine. To the mixture was added deionized water with stirring, to disperse the mixture in water to obtain an aqueous resin dispersion having a nonvolatile content of 40% and a Gardner viscosity (25° C.) of P.

COMPARATIVE EXAMPLE 1

There was repeated the same procedure as in Example 2 except that the epoxy group-containing vinyl copolymer solution and the carboxyl group-containing vinyl copolymer solution were simply mixed and not reacted, to obtain an aqueous resin dispersion having a nonvolatile content of 30% and a Gardner viscosity (25° C.) of A.

COMPARATIVE EXAMPLE 2

50 parts of the carboxyl group-containing vinyl copolymer solution having a solid content of 60%, used in Example 1 was mixed with 50 parts of the epoxy group-containing vinyl copolymer solution having a solid content of 70%, used in Example 6. To the mixture was added 1.5 parts of dimethylaminoethanol. Thereto was added deionized water. The resulting mixture was uniformly stirred to obtain an aqueous resin dispersion having a nonvolatile content of 40% and a Gardner viscosity (25° C.) of A.

Each of the aqueous resin dispersions obtained in Examples and Comparative Examples was coated on a glass plate so as to give a film of 30 μm (as dried) in thickness. Baking was effected for 30 minutes at 140° C. Then, the film was measured for properties.

Each aqueous resin dispersion was also measured for storage stability.

The test results are shown in Table 1.

TEST METHODS

The test items in Table 1 were tested according to the following test methods.

Condition of film surface: Visually checked. ○ indicates no abnormality.

Gel fraction: The baked film was peeled from the glass plate and immersed in acetone for 4 hours under refluxing at about 57° C. The gel fraction of the film was calculated form the following formula.

$$\text{Gel fraction (\%)} = \frac{\text{film weight after immersion}}{\text{film weight before immersion}} \times 100$$

Alkali resistance: A 10% aqueous NaOH solution was allowed to contact with the film formed on the glass plate, to effect a spot test. The contact conditions was 20° C. ×24 hours. ○ indicates no change of the film after contact.

Storage stability: 150 g of each of the aqueous resin dispesions obtained in Examples and Comparative Examples was placed in a closed container having an internal volume of 250 cc and stored at 20° C. for 1 month or 6 months. Change of each dispersion was examined after the storage period.

TABLE 1

| | Example | | | | | | | Comparative Example | |
|---|---|---|---|---|---|---|---|---|---|
| | 1 | 2 | 3 | 4 | 5 | 6 | 7 | 1 | 2 |
| Condition of film surface | ○ | ○ | ○ | ○ | ○ | ○ | ○ | Cloudy | Cloudy |
| Gel fraction (%) | 92.4 | 97.8 | 96.2 | 99.5 | 98.6 | 98.2 | 97.8 | 90.0 | 90.2 |
| Alkali resistance | ○ | ○ | ○ | ○ | ○ | ○ | ○ | Whitening and blistering appeared. | Whitening blistering appeared. |
| Storage stability 20° C. × 1 month | No change | No change | No change | No change | No change | No change | No change | About 10% precipitated. | About 10% precipitated. |
| 20° C. × 6 months | Slight viscosity increase | Slight viscosity increase | No change | No change | No change | Slight viscosity increase | Slight viscosity increase | More than 50% precipitated. | More than 50% precipitated. |

What we claim is:

1. A self-curing aqueous resin dispersion obtained by neutralizing a resin having at least one alicyclic epoxy group and at least two carboxyl groups in the molecule, with a base and dispersing the neutralized resin in water, said alicyclic epoxy group being a component of an alicyclic epoxy group-containing polymerizable monomer selected from the group consisting of the compounds of the following formulas:

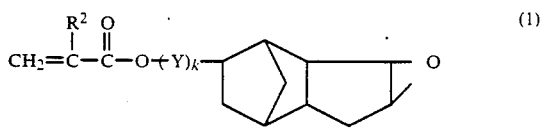

(1)

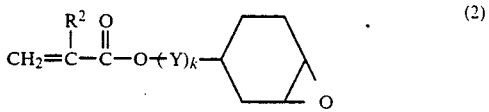

(2)

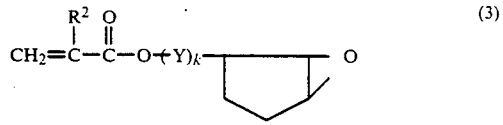

(3)

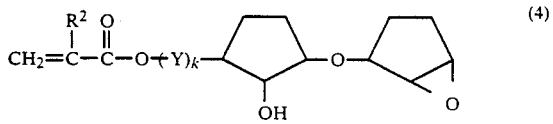

(4)

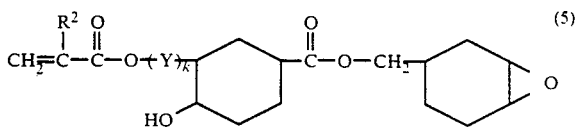

(5)

-continued

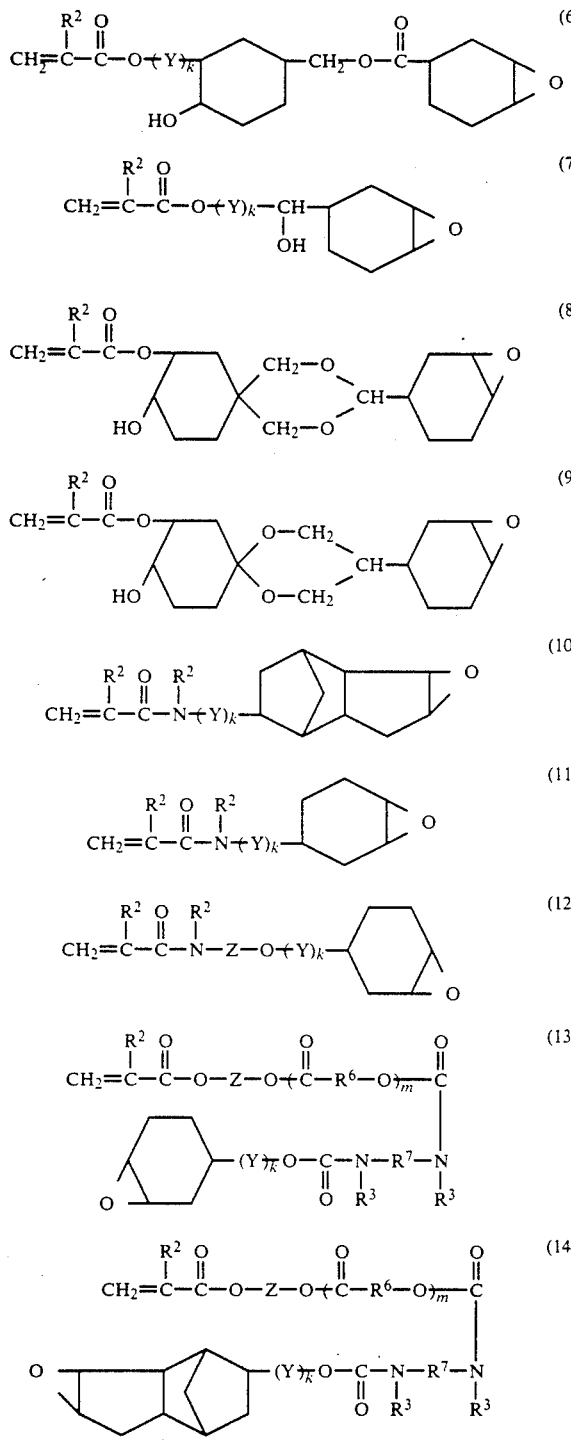

wherein $R^2$ and $R^3$, which may be the same or different from each other, are each a hydrogen atom or a methyl group; Y and Z, which may be the same or different from each other, are each a bivalent group represented by the formula:

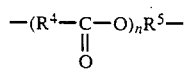

in which $R^4$ is a bivalent aliphatic saturated hydrocarbon group of 1-10 carbon atoms, $R^5$ is a bivalent aliphatic saturated hydrocarbon group of 1-6 carbon atoms, and n is an integer of 0-10; $R^6$ and $R^7$, which may be the same or different from each other, are each a bivalent saturated hydrocarbon group of 1-10 carbon atoms; k is 0 or 1; and m is an integer of 0-10.

2. A dispersion according to claim 1, wherein the resin is a reaction product obtained by subjecting (a) an alicyclic epoxy group-containing vinyl (co)polymer which is a homopolymer of the alicyclic epoxy group-containing polymerizable monomer or a copolymer of said monomer with another monomer copolymerizable therewith and (b) a compund or resin having at least two carboxyl groups in the molecule to a partial addition reaction.

3. A dispersion according to claim 1, wherein the resin has an acid value of 20-200.

4. A dispersion according to claim 3, wherein the resin has an acid value of 30-120.

5. A dispersion according to claim 1, wherein the resin has an epoxy equivalent of 200-5,000.

6. A dispersion according to claim 5, wherein the resin has an epoxy equivalent of 500-2,000.

7. A dispersion according to claim 1, wherein the resin has a number-average molecular weight of 1,000-100,000.

8. A dispersion according to claim 2, wherein the alicyclic epoxy group-containing vinyl (co)polymer has, on average, 5-50 alicyclic epoxy groups in the molecule.

9. A dispersion according to claim 2, wherein the compound or resin (b) having at least two carboxyl groups in the molecule is a low-molecular polybasic carboxylic acid selected from the group consisting of succinic acid, adipic acid, sebacic acid, azelaic acid, decanedicarboxylic acid, phthalic acid, isophthalic acid, terephthalic acid, hexahydrophthalic acid, hexahydroisophthalic acid, hexahydroterephthalic acid, and trimellitic acid; a carboxyl group-containing polyester resin obtained by condensing said polybasic carboxylic acid with a polyhydric alcohol of less than equivalent amount; or a carboxyl group-containing vinyl (co)-polymer.

10. A dispersion according to claim 9, wherein the carboxyl group-containing vinyl (co)polymer is a homopolymer of a carboxyl group-containing unsaturated monomer selected from the group consisting of acrylic acid and methacrylic acid, or a copolymer of said monomer with other monomer copolymerizable therewith.

11. A dispersion according to claim 10, wherein the carboxyl group-containing vinyl (co)polymer has, on average, 5-50 carboxyl groups in the molecule.

12. A dispersion according to claim 2, wherein the resin is a reaction product obtained by subjecting a vinyl polymer having at least two alicyclic epoxy groups in the molecule and a vinyl polymer having at least two carboxyl groups in the molecule, to a partial addition reaction.

13. A dispersion according to claim 1, wherein the resin is a copolymer having an acid value of 20-200 and an epoxy equivalent of 200-5,000, obtained by copolymerizing (A) a carboxyl group-containing polymerizable unsaturated resin obtained by adding said alicyclic epoxy group-containing polymerizable unsaturated monomer to a (co)polymer of a carboxyl group-containing polymerizable unsaturated monomer, to introduce a polymerizable unsaturated group into part of the carboxyl groups of said (co)polymer, (B) an alicyclic epoxy group-containing polymerizable monomer, and optionally (C) an unsaturated monomer copolymerizable with the resin (A) and/or the monomer (B).

14. A dispersion according to claim 1, wherein the resin is a copolymer having an acid value of 20-200 and an epoxy equivalent of 200-5,000, obtained by copolymerizing:

(D) an alicyclic epoxy group-containing polymerizable unsaturated resin obtained by adding a carboxyl group-containing polymerizable unsaturated monomer to a (co)polymer of said alicyclic epoxy group-containing polymerizable unsaturated monomer, to introduce a polymerizable unsaturated group into part of the epoxy groups of said (co)polymer, (E) a carboxyl group-containing polymerizable monomer, and optionally (F) an unsaturated monomer copolymerizable with the resin (D) and/or the monomer (E).

15. A dispersion according to claim 1, wherein the base is a tertiary amine or ammonia.

16. A dispersion according to claim 1, wherein the resin has a neutralization equivalent of 0.1-1.2.

17. A paint composition comprising the aqueous resin dispersion of claim 1.

* * * * *